March 5, 1940.                D. W. POUND                 2,192,802
                        AUXILIARY SPREADER LEAF
                          Filed Dec. 6, 1938              2 Sheets-Sheet 1

Darwin W. Pound
INVENTOR
BY
ATTORNEY

March 5, 1940.                D. W. POUND                    2,192,802
                         AUXILIARY SPREADER LEAF
                           Filed Dec. 6, 1938           2 Sheets-Sheet 2
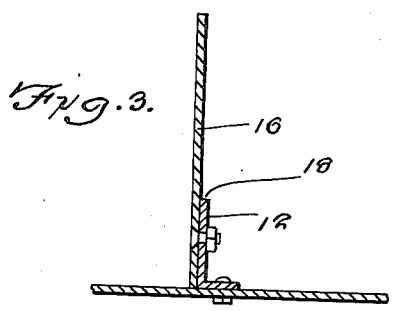
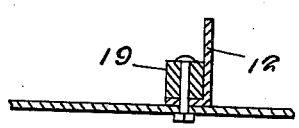
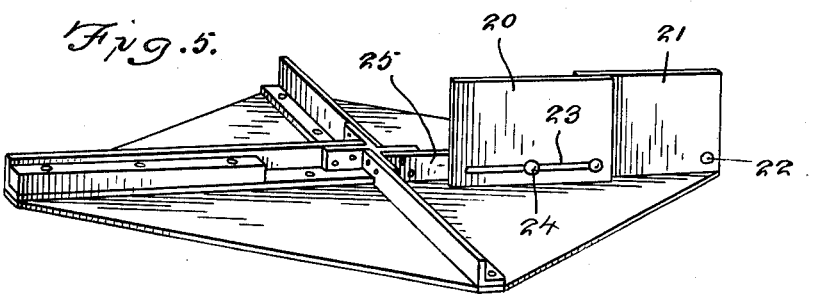
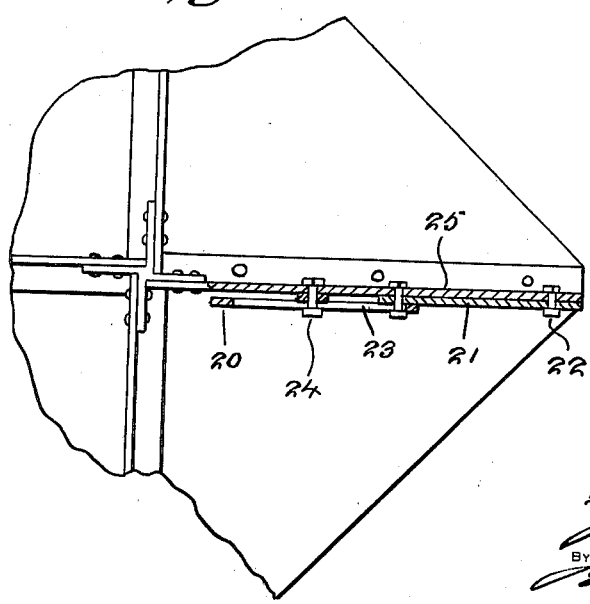
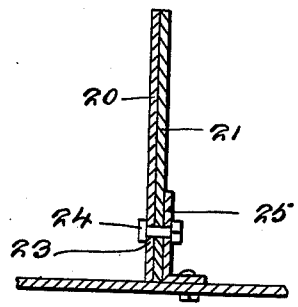
Darwin W. Pound
INVENTOR
BY
ATTORNEY Patented Mar. 5, 1940

2,192,802

UNITED STATES PATENT OFFICE 2,192,802

AUXILIARY SPREADER LEAF

Darwin W. Pound, Newark, Ohio

Application December 6, 1938, Serial No. 244,271

8 Claims. (Cl. 198—128)

The invention relates to material spreaders used in threshing machines, combines, or other like machines and more especially to a rotary spreader leaf for association with a rotary table type straw spreader for distributing or spreading threshed straw when the machine passes over a field.

The primary object of the invention is the provision of a leaf of this character whereby in the operation thereof straw is prevented from settling on the top of the spreader, the straw being immediately thrown off the spreader without settling or gathering upon said spreader, the leaf being higher than the blades or leaves of the straw spreader proper to more forcibly hit or strike the straw in the bunch formation thereof, tearing it apart and causing an even spread of the straw upon the field or ground.

Another object of the invention is the provision of a leaf of this character wherein the same in association with a spreader of the rotary table type and being bladed avoids the possibility of the spreading thereof from becoming deposited in a narrow strip or windrow in that the straw will be acted upon for an even and wide distribution upon the field or ground and by avoiding the laying of the straw in strip formation or windrow, there is no liability of such straw killing the young growing crop and relieving interference with plowing and disking with the result that the ground or soil will be enriched.

A further object of the invention is the provision of a leaf of this character wherein the construction thereof and association with a rotary type of straw spreader possesses novelty and assures a positive and even distribution of straw during the activity of such spreader, the straw in the spreading operation being thrown to a greater area than under the action of a spreader devoid of the auxiliary leaf.

A still further object of the invention is the provision of a leaf of this character which is simple in its construction, thoroughly reliable and effective in operation, positive in action, assuring an even distribution or spreading of straw, strong, durable and inexpensive to manufacture and install.

With these and other objects in view, the invention consists in the features of construction, combination and arrangement of parts as will be hereinafter more fully described in detail, illustrated in the accompanying drawings which disclose the preferred embodiments of the invention and pointed out in the claims hereunto appended.

In the accompanying drawings:

Figure 3 is a section view on the line 3—3 of Figure 2.

Figure 4 is a sectional view on the line 4—4 of Figure 2.

Figure 5 is a perspective view of a modified form of auxiliary leaf.

Figure 6 is a fragmentary longitudinal sectional view therethrough.

Figure 7 is a fragmentary vertical transverse sectional view through the modified form of leaf.

Similar reference characters indicate corresponding parts throughout the several views in the drawings.

Figure 1:
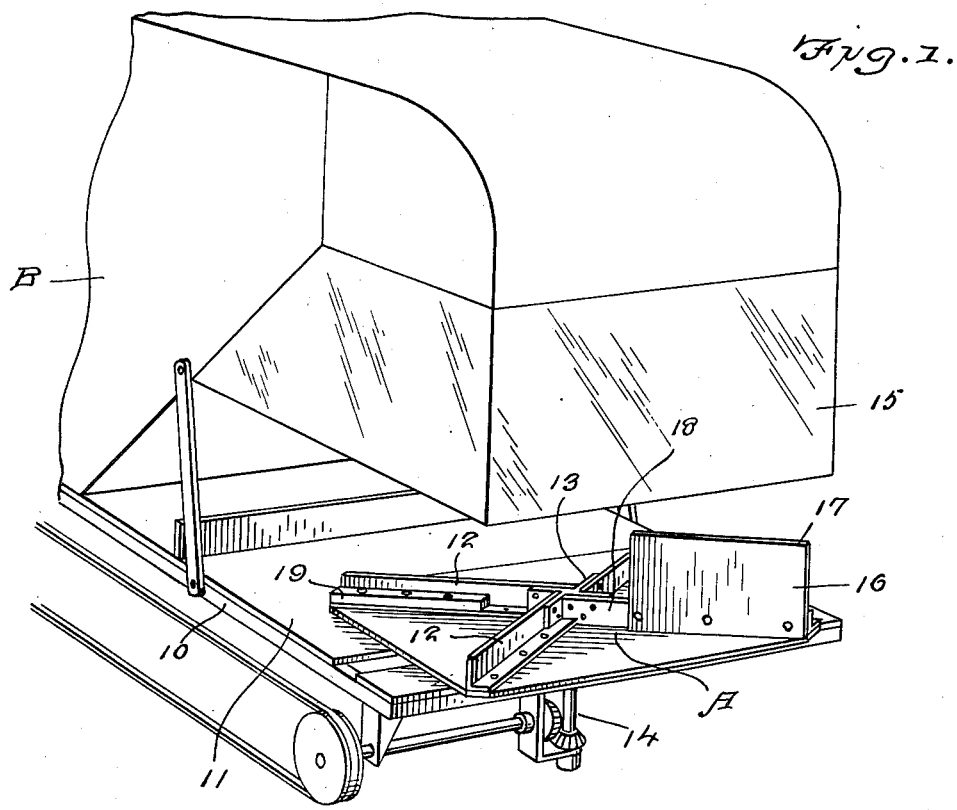
Figure 1 is a fragmentary perspective view of a harvester machine showing the straw spreader with the auxiliary leaf constructed in accordance with the invention applied to the latter.
Figure 2:
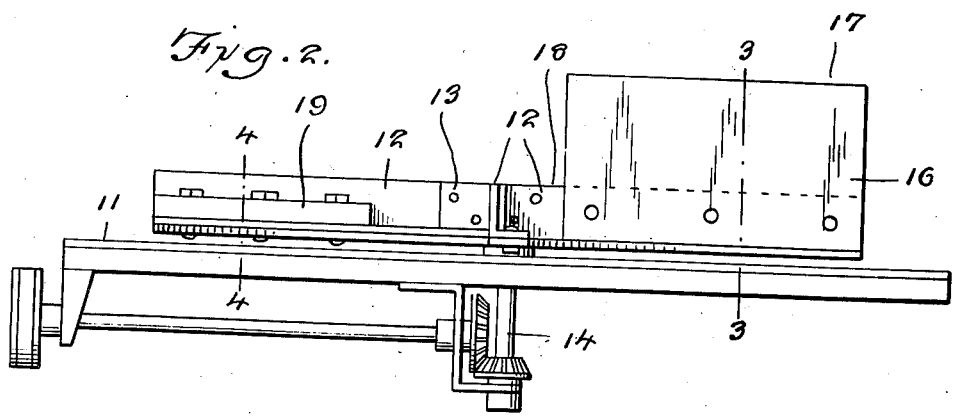
Figure 2 is an enlarged side elevation of the rotary spreader and auxiliary leaf.

Referring to the drawings in detail, particularly Figures 1 to 4 inclusive, A designates generally a rotary bladed type of spreader for use in connection with a threshing machine or the like, a portion of the machine being indicated at B, its framework at 10 and the platform for the spreader at 11 respectively. This platform 11 is preferably made of a sheet of metal, and such platform is disposed in a horizontal plane. The spreader is preferably arranged to sweep through a space common to its blades 12, these being extended radially outwardly from a common axis to which is located a hub 13 fixed to a perpendicular driving axle or stud 14. Suitable means not shown in its entirety are provided for driving the spreader A as well as for driving the discharge mechanism and portions of the threshing machine.

The straw from the separator portion of a combined harvester is preferably discharged onto the rear of the platform 11 and to direct the straw and to nullify the effect of wind, there is preferably provided a hood 15 which is substantially constructed and constitutes a part of the framework of the separator portion of the thresher. The straw discharged onto the platform is acted upon by the spreader A under rotary action thereof so that the straw will be evenly distributed onto the ground or upon the surface thereof in a field. The straw spreader in most cases is advantageously utilized in conjunction with a harvester and particularly with a separator portion of a combined harvester and it is to be understood that such utilization does not limit the use of the spreader to such an installation as it is susceptible for use whenever it is desired to spread straw.

The auxiliary spreader leaf constituting the present invention comprises a sheet metal blade 16, although it may be made from any other suitable material, for example, relatively thin vulcanized or stiff rubber, there being no limitation to the material from which the blade is constructed. This blade 16 is of uniform thickness, width, and is of a required length, being integrally formed or separably attached to one of the blades 12 of the spreader A being preferably located with the outermost end of said blade 16 in juxta-position to the outermost end of the blade 12 with which it is associated of the spreader A while the opposite inner end of this blade 16 terminates next to the hub 13 of said spreader. The blade 16 at its uppermost edge 17 extends a considerable distance above the uppermost edge 18 of the blade 12 with which it is associated and functions in the working of the latter as an auxiliary spread leaf for the rotary spreader. It is preferable to have the blade 16 of the same thickness as are the leaves or blades 12 of the spreader A.

Located on a blade 12 directly opposite that blade 12 with which the blade 16 is associated is a counter-balance strip of member 19, being integral or separably fastened in place and in this way weight is evened up in the use of the auxiliary spreader leaf in association with the rotary spreader A.

In Figures 5 to 7 of the drawings, there is shown a slight modification of the invention wherein the auxiliary leaf or blade is formed in several sections 20 and 21 respectively, the section 20 being movable relative to the section 21 which is preferably fastened as at 22 to one of the blades of the rotary spreader while the section 20 is provided with a slot 23 accommodating a fastener 24 for the adjustment of the said section 20 with relation to the said section 21. These fasteners 22 and 24 are engaged with the blade of the rotary spreader with which the adjustable auxiliary leaf is associated. In this manner by the use of several sections 20 and 21, the length of the auxiliary blade can be easily increased or decreased according to the requirements in the distribution of straw from a harvester to assure an even and positive spreading of the straw onto the ground. The sections 20 and 21 are in overlapped relation to each other and extend perpendicularly or vertically when attached to the companion blade of the rotary spreader, the blade of the rotary spreader having the sections 20 and 21 in association therewith, being indicated at 25.

In the use of the auxiliary leaf the straw acted upon is broken up from bunching or otherwise and such straw is spread uniformly rearwardly of the platform of the harvester and at opposite sides of the latter without the deposit of the straw in narrow strip formation at one side or the other of the harvester or windrow.

The auxiliary spreader leaf constituting the present invention prevents the straw in the operation of a rotary spreader from getting on top of the spreader in that the leaf immediately throws the straw off the spreader and therefore not giving the straw a chance to gather upon said spreader. The auxiliary leaf by reason of its height over and above the height of the leaves and blades of the rotary spreader proper, hits the straw harder or with more force creating a variation in the functioning of the blades of the spreader proper, therefore the straw is being hit in two different ways, namely, by the auxiliary leaf and by the blades of the spreader and this auxiliary leaf digs into a bunch of straw tearing it apart and spreading the straw evenly in the operation of the spreader proper.

It is of course understood that in lieu of the platform 11 created by the sheet metal section or plate, the framework 10 involved in said platform can serve solely as the support for the rotary spreader or in other words, the sheet metal plate 10 or section in this instance being dispensed with so that the spreader in this instance will constitute a turntable or rotor.

It is of course understood that while there has been shown and described preferred and modified forms of construction of the invention, it is contemplated to make changes, variations, and modifications therein as fall properly within the scope of the appended claims without departing from the spirit of the invention or sacrificing any of its advantages.

What is claimed is:

1. A rotary spreader having a plurality of upstanding radially directed blades of uniform height with respect to each other and an auxiliary leaf associated with one of the blades and rising above the uniform height of all of the blades of said spreader.

2. In a rotary spreader having a plurality of upstanding radially directed blades of uniform height with respect to each other, an auxiliary leaf associated with one of the blades and rising above the uniform height of all of the blades of said spreader, and means associated with a blade directly opposite the blade having the leaf associated therewith for counter-balancing action with respect to said leaf.

3. A straw spreader comprising a rotary table-like base, a plurality of radially disposed blades rising from said base and extending from its center and being of uniform height with respect to each other and an auxiliary leaf associated with one of the blades and rising above all of said blades.

4. A straw spreader comprising a rotary table-like base, a plurality of radially disposed blades rising from said base and extending from its center and being of uniform height with respect to each other, an auxiliary leaf associated with one of the blades and rising above all of said blades, and means for adjustably mounting said leaf.

5. A straw spreader comprising a rotary table-like base, a plurality of radially disposed blades rising from said base and extending from its center and being of uniform height with respect to each other, an auxiliary leaf associated with one of the blades and rising above all of said blades, and means for adjustably mounting said leaf, said leaf having its outermost end in juxta-position to the blade next thereto.

6. A straw spreader comprising a rotary table-like base, a plurality of radially disposed blades rising from said base and extending from its center and being of uniform height with respect to each other, an auxiliary leaf associated with one of the blades and rising above all of said blades, means for adjustably mounting said leaf, said leaf having its outermost end in juxta-position to the blade next thereto, and counter-balance means associated with another of the blades and disposed directly opposite the leaf.

7. A spreader of the kind described comprising a rotary table-like base, radial blades extending from the center of said base and of uniform height with respect to each other, a leaf associated with one of the blades and rising above the latter, and means on another of the blades and opposite the leaf for counter-balancing action with respect thereto.

8. A spreader of the kind described comprising a rotary table-like base, radial blades extending from the center of said base and of uniform height with respect to each other, a leaf associated with one of the blades and rising above the latter, means on another of the blades and opposite the leaf for counter-balancing action with respect thereto, and a turning hub associated with said base at the center thereof.

DARWIN W. POUND.